(12) United States Patent
Pichon

(10) Patent No.: US 8,615,480 B2
(45) Date of Patent: Dec. 24, 2013

(54) METHOD, DEVICE AND SYSTEM FOR THE FUSION OF INFORMATION ORIGINATING FROM SEVERAL SENSORS

(75) Inventor: Frédéric Pichon, Paris (FR)

(73) Assignee: Thales, Neuilly sur Seine (FR)

( * ) Notice: Subject to any disclaimer, the term of this patent is extended or adjusted under 35 U.S.C. 154(b) by 272 days.

(21) Appl. No.: 12/954,152

(22) Filed: Nov. 24, 2010

(65) Prior Publication Data

US 2011/0213749 A1 Sep. 1, 2011

(30) Foreign Application Priority Data

Nov. 27, 2009 (FR) .................................... 09 05724

(51) Int. Cl.
*G06F 17/00* (2006.01)
*G06N 5/02* (2006.01)

(52) U.S. Cl.
USPC .......................................................... 706/46

(58) Field of Classification Search
None
See application file for complete search history.

(56) References Cited

U.S. PATENT DOCUMENTS

2007/0088982 A1* 4/2007 Guralnik et al. ................ 714/26
2009/0222399 A1* 9/2009 Gomez et al. ................... 706/52

OTHER PUBLICATIONS

Mercier et al, Refined modeling of sensor reliability in the belief function framework using contextual discounting, Apr. 2008.*
David Mercier, et al., "A Parameterized Family of Belief Functions Correction Mechanisms", Information Processing and Management of Uncertainty in Knowledge-Based System, Jun. 22-27, 2008, pp. 306-313, Malaga, Spain, XP002587071.
D. Dubois, et al., "Relevance and Truthfulness in Information Fusion", Recontres Francophones sur La Logique Floue et Ses Applications, Nov. 5-6, 2009, pp. 1-8, Annecy, FR, XP02587072.
Philippe Smets, "Belief Functions: The Disjunctive Rule of Combination and the Generalized Bayesian Theorem", International Journal of Approximate Reasoning, Aug. 1, 1993, pp.. 1-35, vol. 9, No. 1, XP002587073.
Thierry Denoeux, "Application of Transferable Belief Model to Pattern Recognition", Traitement due Signal, Centrale des Revues, Jan. 1, 1997, pp. 443-451, vol. 14, No. 5, Montrouge, FR, XP001031928.
Isabelle Bloch, "Chapitre 7—Theorie des Croyances de Dempster-Shafer", Jan. 1, 2003, pp. 119-149, Hermes, Paris, FR, XP002587074.
Thierry Denoeux, "The Cautious Rule of Combination for Belief Functions and Some Extensions", 2006 9th International Conference on Information Fusion, Jul. 1, 2006, pp. 1-8, IEEE, Piscataway, NJ, USA, XP031042313.

* cited by examiner

*Primary Examiner* — Jeffrey A Gaffin
*Assistant Examiner* — Mikayla Chubb
(74) *Attorney, Agent, or Firm* — Baker & Hostetler LLP

(57) ABSTRACT

The invention relates to a method, device and system for fusion of information originating from several sensors. The invention includes a mechanism for fusion of belief functions. To apply this mechanism, various information, knowledge and operations are modelled within the framework of the theory of belief functions: information provided by the sensors, knowledge regarding the propensity of the sensors to be in a given operating state, and merge operators for each operating state considered.

8 Claims, 2 Drawing Sheets

METHOD, DEVICE AND SYSTEM FOR THE FUSION OF INFORMATION ORIGINATING FROM SEVERAL SENSORS

CROSS-REFERENCE TO RELATED APPLICATION

This application claims priority to foreign French patent application No. FR 09 05724, filed on Nov. 27, 2009, the disclosure of which is incorporated by reference in its entirety.

FIELD OF THE INVENTION

The invention relates to the fusion of information originating from several sensors and more particularly to the fusion of imperfect information originating from sensors whose operating state is known.

BACKGROUND OF THE INVENTION

Systems integrating several sensors are used in a great variety of sectors such as site surveillance, maintenance, robotics, medical diagnosis or meteorological forecasts. Such systems carry out, for example, functions of classification, identification and tracking in real time.

To best exploit multi-sensor systems, it is necessary to use an effective scheme for fusion of information so as to combine the data originating from the various sensors of the system and generate a decision.

According to the known art, certain information fusion schemes rely on Dempster-Shafer theory and thus use belief functions, which is the basic tool for representing information in this theory. Belief functions are known for their capacity to faithfully represent imperfect information. Information comprising an imprecision or an uncertainty or incomplete information is called imperfect information. The sensors of a system are considered to be imperfect information sources, notably because of their imprecision. The term sensor is understood here in the broad sense. It includes physical devices for data acquisition (camera, radar, etc.) but also devices for processing these data. It is possible to establish a belief function on the basis of the data provided by most commercially available sensors. Schemes for combining belief functions may be used. By dint of their nature, these schemes are therefore particularly appropriate to the problem of the fusion of imperfect information arising from sensors.

Let X be a variable with values in a finite set $\Omega$. The information held by a sensor as regards the value actually taken by X may be quantified by a belief function. A belief function is formally defined as a function, denoted bel, from the power set of $\Omega$, denoted $2^\Omega$, in the interval [0,1] and satisfying certain mathematical properties. The quantity bel(A) represents the total degree of belief allocated by the sensor to the fact that the value of X is in A, where A is a part (also called a subset) of $\Omega$ (this being written $A \subset \Omega$). There exist various equivalent representations of a belief function, which are useful in practice. In particular, the mass function, denoted m, is a function from $2^\Omega$ to [0,1] which satisfies the condition:

$$\sum_{A \subseteq \Omega} m(A) = 1.$$

The quantity m(A), called the mass of A, represents the degree of belief allocated to A (and to no strict subset). The belief function bel associated with a mass function m is obtained in the following manner:

$$\text{bel}(A) = \Sigma_{\emptyset \neq B \subseteq A} m(B),$$

for all $A \subset \Omega$. The mass function m associated with a belief function bel is obtained in the following manner:

$$m(A) = \Sigma_{\emptyset \neq B \subseteq A}(-1)^{|A|-|B|} \text{bel}(B),$$

for all $A \subset \Omega$. By dint of the one-to-one correspondence between a belief function bel and its associated mass function m, we will use the name Belief Function (BF) in the broad sense in this document to designate both a belief function bel and also its associated mass function m (the context is generally sufficient to determine whether the objects manipulated are mass functions m or belief functions bel).

It is possible to consider by way of nonlimiting example, a multi-sensor system of classifier type used for the optical recognition of hand-written characters. It is assumed that the system is intended to determine whether the character formed on an image I (not represented) is one of the letters 'a' or 'b'. Let X be the variable associated with the character. We therefore have a set of values $\Omega = \{a, b\}$ for the variable (the character) X. Each of the sensors of the system is a classifier which itself provides an item of information regarding the character to be recognized in the form of a BF. It is assumed that there are two sensors of this type in our example. The sensor $C_1$ provides a belief function $m_{C1}$ defined as follows:

$m_{C1}(\emptyset) = 0$ $m_{C1}(\{a\}) = 0.8$ $m_{C1}(\{b\}) = 0$ $m_{C1}(\{a,b\}) = 0.2$ In this example, the sensor $C_1$ considers that it is highly probable (0.8) that the character to be recognized is {a}. $m_{C1}(\{a,b\}) = m_{C1}(\Omega) = 0.2$ represents the sensor's ignorance. The sensor $C_2$ provides a belief function $m_{C2}$ defined as follows:

$m_{C2}(\emptyset) = 0$ $m_{C2}(\{a\}) = 0.2$ $m_{C2}(\{b\}) = 0$ $m_{C2}(\{a,b\}) = 0.8$ The function $m_{C2}$ conveys the fact that the sensor $C_2$ has fairly little information regarding the character observed: the sensor ascribes a small degree of belief (0.2) to the character {a} and a large degree of belief (0.8) to ignorance, that is to say to the set $\Omega = \{a, b\}$.

Dempster-Shafer theory makes it possible to combine the belief functions representing information arising from different sources, so as to obtain a belief function taking into account the influences of each of the sources. The belief function thus obtained, called the merged belief function, represents the combined knowledge of the various imperfect information sources (the sensors).

In order to obtain a merged belief function representative of reality, it is necessary to take into account knowledge pertaining to the states of the sources.

The known information fusion schemes only make it possible to take into account certain types of knowledge regarding the states of the sources (sensors). Indeed, the existing solutions are limited to the consideration of particular knowledge regarding the dependency, the competence and the sincerity of the sources. For example, a merge operator making it possible to merge information arising from independent and competent sources is already known. This operator is known in the literature by the name "unnormalized Dempster's rule". We denote this operator by the symbol $\oplus^D$. Thus, the BF resulting from the fusion by $\oplus^D$ of two BFs $m_{C1}$ and $m_{C2}$ is denoted $m_{C1} \oplus^D m_{C2}$. The definition of the operator $\oplus^D$ is as follows. Consider two belief functions $m_{C1}$ and $m_{C2}$, we have, for all $A \subseteq \Omega$:

$$m_{C1} \oplus^D m_{C2}(A) = \sum_{B \cap C = A} m_{C1}(B) m_{C2}(C).$$

Applying the formula to the two belief functions $m_{C1}$ and $m_{C2}$ given as an example above, we obtain:

$$m_{C1} \oplus^D m_{C2}(\{a\}) = m_{C1}(\{a\}) m_{C2}(\{a\}) + m_{C1}(\{a\}) m_{C2}(\{a, b\}) +$$
$$m_{C1}(\{a, b\}) m_{C2}(\{a\})$$
$$= 0.8 * 0.2 + 0.8 * 0.8 + 0.2 * 0.2$$
$$= 0.84$$

$$m_{C1} \oplus^D m_{C2}(\{a, b\}) = m_{C1}(\{a, b\}) m_{C2}(\{a, b\})$$
$$= 0.8 * 0.2$$
$$= 0.16$$

We also deduce $m_{C1} \oplus^D m_{C2}(\{b\}) = 0$ and $m_{C1} \oplus^D m_{C2}(\emptyset) = 0$ through the condition $$\sum_{A \subseteq \Omega} m(A) = 1$$

for every BF m.

A merge operator making it possible to merge information arising from independent sources at least one of which is competent is also already known. This operator is known in the literature by the name "disjunctive rule". We denote this operator by the symbol $\oplus^{DP}$.

A more general operator than the operators $\oplus^D$ and $\oplus^{DP}$ is also already known, making it possible to take into consideration knowledge such as the propensity of the sensors to be in some such state in regard to their competence and their sincerity, rather than in some such other state. This operator, however, requires that the sensors be independent. For example, if we denote by E1 the state "the sources are competent and independent" and by E2 the state "the sources are independent and at least one is competent", this operator can take into account knowledge of the type: "with a probability p, the sources are in the state E1 (i.e. with a probability p, the sources are competent and independent), and with a probability 1−p, they are in the state E2 (i.e. with a probability 1−p the sources are independent and at least one is competent)".

A merge operator making it possible to merge information arising from competent and non-independent sources is also already known. This operator is known in the literature by the name "cautious rule". We denote this operator by the symbol $\oplus^P$. Thus, the BF resulting from the fusion by $\oplus^P$ of two BFs $m_{C1}$ and $m_{C2}$ is denoted $m_{C1} \oplus^P m_{C2}$. The definition of the operator $\oplus^P$ being complex in the general case, but simple in the case of belief functions of the type of those given as an example above, we are content here merely to give the definition of the cautious rule for belief functions of the type of those given as an example above. Consider two belief functions $m_{C1}$ and $m_{C2}$ on $\Omega = \{a, b\}$ such that:

$$m_{C1}(\{a\}) = 1 - y, \; m_{C1}(\{a, b\}) = y$$

and $$m_{C2}(\{a\}) = 1 - z, \; m_{C2}(\{a, b\}) = z,$$

with $y, z \in (0, 1)$ (we therefore have $m_{C1}(\emptyset) = 0$, $m_{C1}(\{b\}) = 0$, and $m_{C2}(\emptyset) = 0$, $m_{C2}(\{b\}) = 0$ through the condition $$\sum_{A \subseteq \Omega} m(A) = 1$$

for every BF m). The result $m_{C1} \oplus^P m_{C2}$ of the fusion by the cautious rule of the BFs $m_{C1}$ and $m_{C2}$ is then obtained with the formula:

$$m_{C1} \oplus^P m_{C2}(\{a\}) = 1 - \text{minimum}(y, z),$$

$$m_{C1} \oplus^P m_{C2}(\{a, b\}) = \text{minimum}(y, z).$$

Applying the formula to the two belief functions $m_{C1}$ and $m_{C2}$ given as an example above, we obtain:

$$m_{C1} \oplus^P m_{C2}(\{a\}) = 1 - \text{minimum}(0.8, 0.2) = 1 - 0.2 = 0.8,$$

$$m_{C1} \oplus^P m_{C2}(\{a, b\}) = \text{minimum}(0.8, 0.2) = 0.2.$$

Note that there also already exists an operator, called the "bold rule", making it possible to merge information arising from non-independent sources at least one of which is competent.

However, these known fusion schemes do not make it possible to take into account all the types of knowledge regarding the dependency, the competence and the sincerity of the sources. For example, if we denote by E1 the state "the sources are competent and non-independent" and by E2 the state "the sources are independent and at least one is competent", the known schemes do not make it possible to process the knowledge: "with a probability p, the sources are in the state E1 and with a probability 1−p, they are in the state E2", although the operators which correspond to the states E1 and E2 (respectively, the cautious rule and the disjunctive rule) are already known. More generally, it is possible to define $E = \{E1, \ldots, EN\}$ the set of possible operating states of the sensors and $\oplus^{Ei}$ the operator corresponding to the state Ei where the states Ei, $i = 1, \ldots N$, considered do not necessarily deal with the dependency, the competence and the sincerity of the sources. In this case, no general scheme exists making it possible to merge the imperfect information arising from the sensors when we have knowledge regarding the states of the sensors of the type "with a probability pi, the sensors are in the state Ei, $i = 1, \ldots N$".

SUMMARY OF THE INVENTION

The invention is aimed at alleviating the problems cited above by proposing a method, a device and a system for fusion of information originating from several sensors making it possible to calculate a merged belief function, by taking into account knowledge regarding the operating states of the sensors.

For this purpose, the subject of the invention is a method for fusion of information originating from several sensors each producing a belief function representing knowledge on a reasoning space, and comprising several operating states, the said method comprising a step of calculating a merged belief function and being characterized in that it comprises, furthermore, a step of calculating conditional belief functions on the basis of the belief functions produced by the sensors and of a predefined base of operators comprising associations between states of sensors and merge operators, a conditional belief function representing knowledge of a sensor on the reasoning space when the said sensor is in a given operating state, and in that the step of calculating the merged belief function uses the conditional belief functions calculated and knowledge arising from a knowledge base (104) regarding the operating state of the sensors.

According to a first variant of the invention, the knowledge regarding the operating state of the sensors is represented by a belief function indicating the propensity of the sensors to be in a given operating state.

According to the first variant of the invention, the merged belief function ($m_F$) follows the following relation:

$$m_F = ((\oplus_{i=1,\ldots,N}{}^D m^\Omega [Ei]^{\uparrow E \times \Omega}) \oplus^D m^{E \uparrow E \times \Omega})^{\downarrow \Omega}$$

where $\oplus^D$ is an operator called the unnormalized Dempster's rule, $m^\Omega[Ei]$, with $i=1,\ldots,N$, are conditional belief functions representing knowledge on the reasoning space ($\Omega$) when the sensors are in various states, N being the number of operating states, and $m^E$ is knowledge regarding the operating state of the sensors, $\uparrow$, $\downarrow$ and $\Uparrow$ being operations for manipulating belief functions.

According to a second variant of the invention, the step (106) of calculating the merged belief function uses contextual information expressed in the following manner: if an object observed by the sensors is of type A then the sensors have a propensity p to be in a set of states E', where A is a subset of the space of propositions ($\Omega$) and E' is a subset of a set E of the various states of the sensors.

According to the second variant of the invention, the merged belief function follows the following relation:

$$m_F = ((\oplus_{i=1,\ldots,N}{}^D m^\Omega [Ei]^{\uparrow E \times \Omega})$$
$$\oplus^D (\oplus_{j=1,\ldots,K}{}^D m^E [Aj]^{\uparrow E \times \Omega}))^{\downarrow \Omega}$$

where $\oplus^D$ is an operator called the unnormalized Dempster's rule, $m^\Omega[Ei]$, with $i=1,\ldots,N$, are conditional belief functions representing knowledge on the reasoning space ($\Omega$) when the sensors are in various states (E1, ..., EN), N being the number of operating states, and $m^E[Aj]$ is contextual knowledge regarding the propensity of the sensors to be in a given operating state when an object observed by the sensor is of type $A_j$, with $j=1,\ldots,K$, $A_j$ being a subset of $\Omega$ and such that $A_1,\ldots,A_K$ forms a partition of $\Omega$, $\uparrow$, $\downarrow$ and $\Uparrow$ being operations for manipulating belief functions.

The invention also relates to a device for fusion of information originating from several sensors each producing a belief function representing knowledge on a reasoning space, and comprising several operating states, the device comprising means for the calculation of a merged belief function and being characterized in that it comprises, furthermore means for the calculation of conditional belief functions, said means being linked to the sensors and to a predefined base of operators comprising associations between states of sensors and merge operators, a conditional belief function representing knowledge of a sensor on the reasoning space when the said sensor is in a given operating state, and in that the means for the calculation of the merged belief function use the conditional belief functions calculated and knowledge regarding the operating state of the sensors originating from a knowledge base regarding the operating state of the sensors.

The invention also relates to a system for fusion of information comprising: at least two sensors each producing a belief function and means for fusion of the belief functions originating from the said sensors, the said fusion means being linked to the sensors, the said system being characterized in that the means for fusion of information comprise the device for fusion of information according to the invention.

The invention relies on a mechanism for fusion of belief functions. To apply this mechanism, various information, knowledge and operations must be modelled within the framework of the theory of belief functions: information provided by the sensors, knowledge regarding the propensity of the sensors to be in a given operating state and merge operators for each operating state considered.

The advantage of the invention is to take into account the knowledge regarding the operating states of the sources. Precisely, the invention makes it possible to take into account knowledge of the type: "with a probability pi, the sources are in the state Ei", on the condition that there exists a belief function fusion operator $\oplus^{Ei}$ corresponding to the state Ei.

More generally, let $E=\{E1,\ldots,EN\}$ be the set of states of the sources, the advantage of the invention is to take into account imperfect knowledge, represented by a belief function $m^E$ defined on the set E, on the operating states of the sources.

The provided solution also allows the consideration of knowledge on the contextual behaviours of the sources. For example, the invention allows the consideration of the following knowledge: "knowing that the letter observed is of type 'a', the sensors are independent and competent, and knowing that the letter is 'b', the sensors are competent and are not independent".

BRIEF DESCRIPTION OF THE DRAWINGS

The invention will be better understood and other advantages will become apparent on reading the detailed description given by way of nonlimiting example and with the aid of the figures among which.

DETAILED DESCRIPTION

Generally, a fusion system comprises at least two sensors used to observe objects. These observations are used to class the object among predetermined categories. The set of these categories is called the reasoning space and is denoted $\Omega$. When an object is observed by these sensors, each of these sensors provides information on this object in the form of a belief function.

We propose to illustrate the method according to the invention, by way of nonlimiting example, with the previously mentioned multi-sensor system of classifier type used for the optical recognition of hand-written characters. It is assumed that the system is intended to determine whether the character formed on an image I (not represented) is one of the letters 'a' or 'b'.

The term sensor is understood here in the broad sense. It includes physical devices for data acquisition (camera, micro, etc.) but also devices for processing these data, in the example: a classifier.

Figure 1:
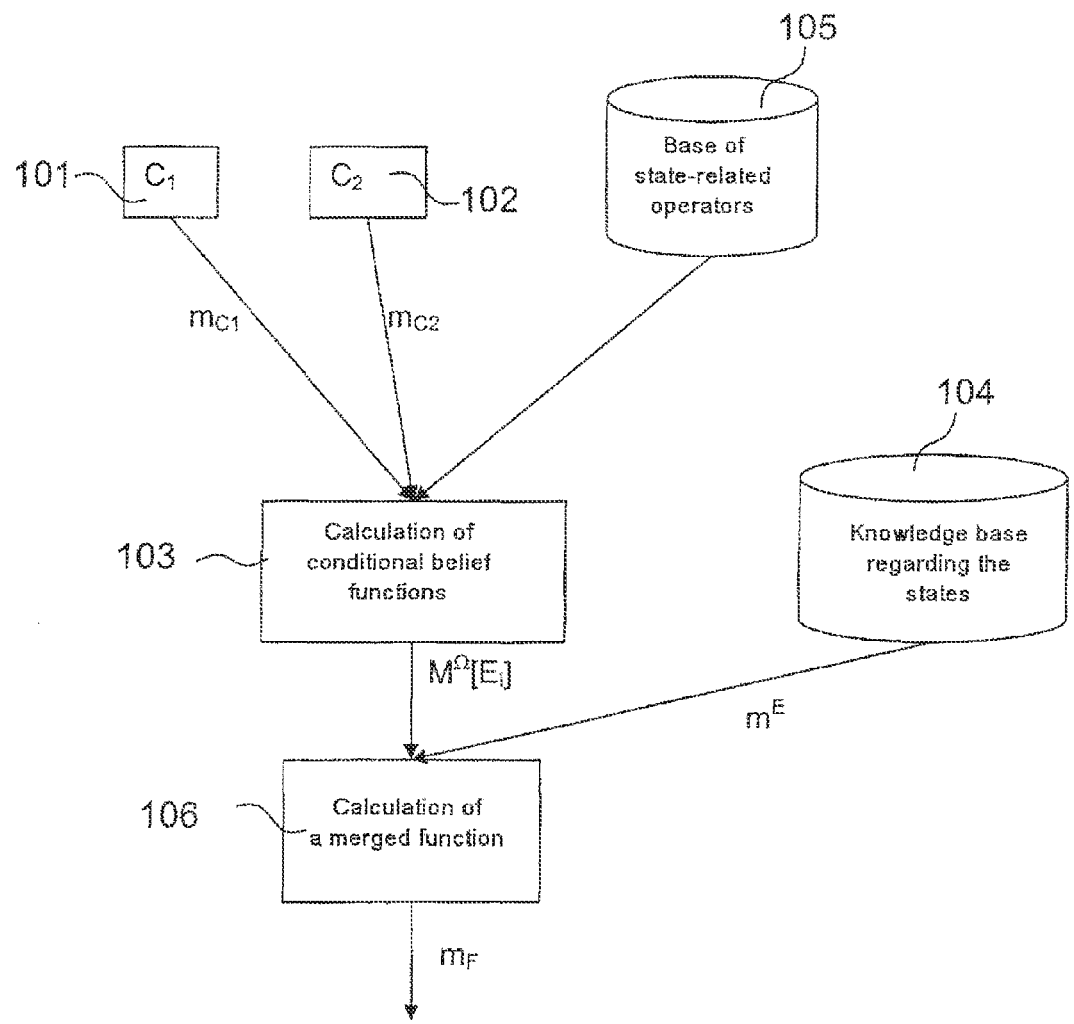
FIG. 1 represents a chart of the method according to the invention.
Figure 2:
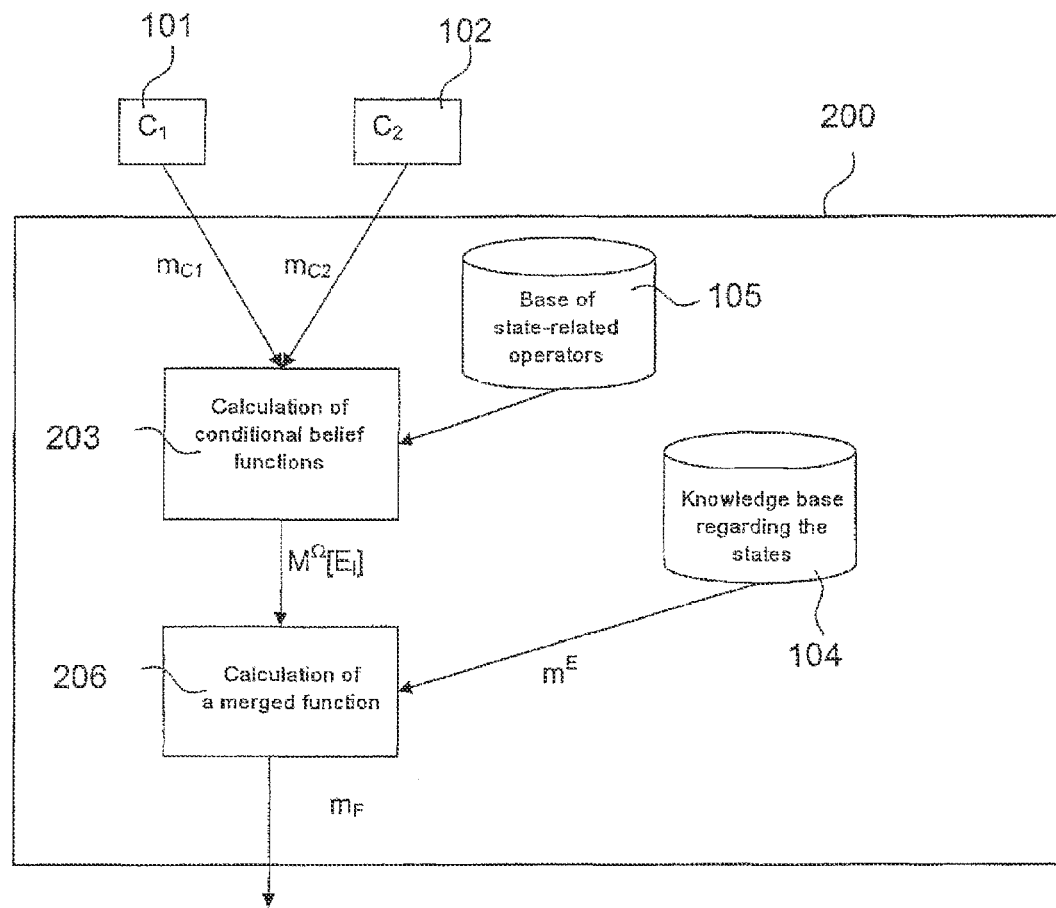
FIG. 2 represents an exemplary implementation of the device according to the invention.

An exemplary embodiment of a system for fusion of information according to the invention is illustrated by FIG. 1. Such a system comprises a first classification system $C_1$ 101 and a second classification system $C_2$ 102. It is assumed that each of the two classification systems comprises a device allowing the acquisition of the image I such as a video camera for example, and means for processing the signal comprising character recognition on the basis of the captured image I and the creation of a belief function $m_{Ci}$ representing the knowledge of the sensor Ci on $\Omega=\{a, b\}$, with i=1,2.

In the example, the first sensor $C_1$ provides a belief function $m_{C1}$ defined as follows:

$$m_{C1}(\{a\})=0.8$$

$$m_{C1}(\{a,b\})=0.2.$$

The sensor $C_2$ provides a belief function $m_{C2}$ defined as follows:

$$m_{C2}(\{a\})=0.2$$

$$m_{C2}(\{a,b\})=0.8$$

The method according to the invention makes it possible to take into account knowledge regarding the operating state of the sensors. E denotes the space of states of the sensors with $E=\{E1, \ldots, En\}$. $E1, \ldots, En$ each represent an operating state of the set of sensors, for example: "the sensors are independent and competent". The method according to the invention uses a knowledge base 104 on the states of the sensors.

In this example, we have knowledge regarding the states of the two classification systems $C_1$ and $C_2$. The pattern recognition schemes according to the known art rely on techniques for automatic learning using predetermined learning bases. In the example, it is assumed that the knowledge base 104 describes two states of the sensors. A first state E1, corresponding to the case where the classifiers are trained on different learning bases, indicates that the two sensors are independent and competent. A second state E2 corresponding to the case where the classifiers are trained on the same learning base, indicates that the two sensors are non-independent and competent.

According to a characteristic of the invention, the knowledge regarding the operating state of the sensors are represented by a belief function $m^E$ indicating the propensity of the sensors to be in a given state.

In the example, the belief function $m^E$ is defined as follows:

$$m^E(\{E1\})=0.8$$

$$m^E(\{E2\})=0.2$$

The belief function indicates that the sensors have a propensity to be in the first state E1 (the two sensors are independent and competent) greater than the propensity to be in the second state E2 (the two sensors are non-independent and competent).

The method according to the invention uses a base of operators related to the states 105 in which the states $E1, \ldots, EN$ are associated with merge operators $\oplus^{E1}, \ldots, \oplus^{EN}$. In the example, the base of operators 105 is produced in the form of a table associating a merge operator with each of the states E1 and E2:

| States | Operators |
|--------|-----------|
| E1     | $\oplus^D$ |
| E2     | $\oplus^P$ |

As may be seen in this table, the state E1 ("the two sensors are independent and competent") is associated with the operator $\oplus^D$ (the unnormalized Dempster's rule), and the state E2 ("the two sensors are non-independent and competent") is associated with the operator $\oplus^P$ (the cautious rule).

The method comprises a step 103 of calculating so-called conditional belief functions $m^\Omega[Ei]$, i=1, ..., N, on the basis of the belief functions $m_{C1}$ and $m_{C2}$ produced by the sensors C1,C2 and of the base of operators 105 relating the states to operators. The conditional belief functions $m^\Omega[Ei]$, i=1, ..., N, represent the knowledge on $\Omega$ when the sources are in the states Ei, i=1, ..., N. Knowing that the information provided by the sensors must be merged by the operator $\oplus^{Ei}$ when the sources are in the state Ei, we therefore have $m^\Omega[Ei](A)=m_{C1}\oplus^{Ei}m_{C2}(A)$, for all $A \subseteq \Omega$ and i=1, ..., N. In practice, conditional belief functions are calculated only for certain states $Ei \in E$: all the states $Ei \in E' \subseteq E$ with $E'=\{Ej:Ej \in E'', m(E'') \neq 0, E'' \subseteq E\}$.

A step 106 of calculating the merged belief function $m_F$ is carried out by taking into account the knowledge regarding the states of the sources, represented by the belief function $m^E$, and the conditional belief functions calculated in the previous step 103. According to a first variant of the invention, the merged belief function $m_F$ is calculated in the following manner:

$$m_F=((\oplus_{i=1,\ldots,N}^D m^\Omega[Ei]^{\uparrow E\times\Omega}) \oplus^D m^{E\uparrow E\times\Omega})^{\downarrow\Omega}$$

with $\uparrow$, $\downarrow$ and $\Uparrow$ operations for manipulating belief functions on product spaces known in the literature, respectively, as vacuous extension, marginalization and deconditioning and defined by the following formulae.

Let $m^E$ be a belief function on the space E. Its vacuous extension to the product space $E\times\Omega$ is a belief function denoted $m^{E\uparrow E\times\Omega}$ and given by:

$$m^{E\uparrow E\times\Omega}(B) = \begin{cases} m^E(A) & \text{if } B = A \times \Omega, A \subseteq E, \\ 0 & \text{otherwise.} \end{cases}$$

Let $m^\Omega[Ei]$ be a conditional belief function on the space $\Omega$, with $Ei \in E$. Its deconditioning to the product space $E\times\Omega$ is a belief function denoted $m^\Omega[Ei]^{\Uparrow E\times\Omega}$ and given by:

$$m^\Omega[Ei]^{\Uparrow E\times\Omega}(C) = \begin{cases} m^\Omega[Ei](A) & \text{if } C = (A \times Ei) \cup (\Omega \times (E \setminus Ei)), A \subseteq \Omega \\ 0 & \text{otherwise.} \end{cases}$$

Let $m^{E\times\Omega}$ be a belief function on the product space $E\times\Omega$. Its marginalization on the space $\Omega$ is a belief function denoted $m^{E\times\Omega\downarrow\Omega}$ and given by:

$$m^{E\times\Omega\downarrow\Omega}(A) = \sum_{\{B\subseteq E\times\Omega|Projection(B\downarrow\Omega)=A\}} m^{E\times\Omega}(B), \text{ for all } A \subseteq \Omega.$$

By applying to the example the formula making it possible to calculate the merged belief function $m_F$, we obtain:

$$m_F=(m^\Omega[E1]^{\Uparrow E\times\Omega} \oplus^D m^\Omega[E2]^{\Uparrow E\times\Omega} \oplus^D m^{E\uparrow E\times\Omega})^{\downarrow\Omega}$$

with $$m^\Omega[E1]=m_{C1}\oplus^D m_{C2},$$

$$m^{C1}[E2]=m_{C1}\oplus^P m_{C2},$$

which signifies that when the sources are in the state E1, the knowledge on $\Omega$ is obtained by fusion $m_{C1}$ and $m_{C2}$ with the unnormalized Dempster's rule, and when the sources are in the state E2, the knowledge on $\Omega$ is obtained by fusion $m_{C1}$ and $m_{C2}$ with the cautious rule.

Next, by applying the formulae for vacuous extension, marginalization, deconditioning and Dempster's rule, the following result known in the literature is obtained:

$$m_F = m^E(\{E1\}) * m_{C1} \oplus^D m_{C2} + m^E(\{E2\}) * m_{C1} \oplus^P m_{C2},$$

and in particular $$m_F(\{a\}) = m^E(\{E1\}) * m_{C1} \oplus^D m_{C2}(\{a\}) + m^E(\{E2\}) * m_{C1} \oplus^P m_{C2}(\{a\}),$$

$$m_F(\{a,b\}) = m^E(\{E1\}) * m_{C1} \oplus^D m_{C2}(\{a,b\}) + m^E(\{E2\}) * m_{C1} \oplus^P m_{C2}(\{a,b\}).$$

By applying the formulae for Dempster's rule $\oplus^D$ and for the cautious rule $\oplus^P$, we then obtain $$m_F(\{a\}) = m^E(\{E1\}) * (m_{C1}(\{a\}) * m_{C2}(\{a\}) + m_{C1}(\{a\}) * m_{C2}(\{a,b\}) + m_{C1}(\{a,b\}) * m_{C2}(\{a\})) + m^E(\{E2\}) * (1 - \text{minimum}(m_{C1}(\{a,b\}), m_{C2}(\{a,b\}))) = 0.8 * (0.8 * 0.2 + 0.8 * 0.8 + 0.2 * 0.2) + 0.2(1 - \text{minimum}(0.2, 0.8)) = 0.8 * 0.84 + 0.2 * 0.8 = 0.832$$

$$m_F(\{a,b\}) = m^E(\{E1\}) * (m_{C1}(\{a,b\}) * m_{C2}(\{a,b\})) + m^E(\{E2\}) * (\text{minimum}(m_{C1}(\{a,b\}), m_{C2}(\{a,b\}))) = 0.8 * (0.2 * 0.8) + 0.2 * \text{minimum}(0.2, 0.8) = 0.8 * 0.16 + 0.2 * 0.2 = 0.168$$

The result of the merge indicates that it is highly probable that the character observed is an $\{a\}$, although a slight degree of ignorance persists.

According to a second variant of the invention, the step of calculating the merged belief function uses a contextual item of information. A contextual item of information specifies an operating state of the sensor in a particular context. This item of information is expressed in the following form: "knowing that the object observed is of type A, the sensors have a propensity p to be in the set of states E" where A is a subset of $\Omega$ and E' is a subset of a set E of the various states (E1, ..., EN) of the sensors.

In the example, the classifiers $C_1$ and $C_2$ are independent in respect of recognizing the letter 'a' since they have been trained on different learning bases for the recognition of this letter. The same classifiers $C_1$ and $C_2$ are non-independent in respect of recognizing the letter 'b' since they have been trained on the same learning base for the recognition of this letter.

In this case, the knowledge regarding the operating states of the sensors is no longer represented by a belief function $m^E$, but by a plurality of conditional belief functions, denoted $m^E[A_1], \ldots, m^E[A_K]$, representing the knowledge regarding the states of the sources when the value taken by the variable X is in the part $A_j$ of $\Omega$, $j=1, \ldots, K$. Note that forms a partition of $\Omega$. There are then potentially $|\Omega|$ conditional belief functions if the behaviours of the sources for every element of $\Omega$ are known.

In the example, there is contextual knowledge expressed by the following conditional belief functions:

$m^E[\{a\}](E_1)=1$ indicating that knowing that the observed object is the letter $\{a\}$ the sensors are competent and independent, $m^E[\{b\}](E_2)=1$ indicating that knowing that the observed object is the letter b the sensors are competent and non-independent.

According to a second variant embodiment of the invention, the merged belief function is then calculated as follows:

$$m_F = \left(\left(\bigoplus_{i=1,\ldots,N}^D m^\Omega[Ei]^{\uparrow E \times \Omega}\right) \oplus^D \left(\bigoplus_{j=1,\ldots,K}^D m^E[Aj]^{\uparrow E \times \Omega}\right)\right)^{\downarrow \Omega}$$

with $$m^E[Aj]^{\uparrow E \times \Omega}(A) = \begin{cases} m^E[Aj](C) & \text{if } A = (C \times Aj) \cup (E \times (\Omega \setminus Aj)), C \subseteq E \\ 0 & \text{otherwise.} \end{cases}$$

$m^E[Aj]$ is contextual knowledge regarding the propensity of the sensors to be in a given operating state, $m^E[Aj](E')$ indicating the propensity of the sensor to be in the set of states $E' \subset E = \{E1, \ldots, EN\}$ knowing that the observed object is in Aj.

By applying to the example the formula making it possible to calculate the merged belief function $m_F$, we obtain:

$$m_F = (m^\Omega[E1]^{\uparrow E \times \Omega} \oplus^D m^\Omega[E2]^{\uparrow E \times \Omega} \oplus^D m^E[\{a\}]^{\uparrow E \times \Omega} \oplus^D m^E[\{b\}]^{\uparrow E \times \Omega})^{\downarrow \Omega}$$

In order to calculate $m_F$ on the basis of this formula, it is therefore necessary 1. To calculate the deconditionings on $E \times \Omega$ of $m^\Omega[E1]$, $m^\Omega[E2]$, $m^E[\{a\}]$ and $m^E[\{b\}]$, that is to say calculate $m^\Omega[E1]^{\uparrow E \times \Omega}$, $m^\Omega[E2]^{\uparrow E \times \Omega}$, $m^E[\{a\}]^{\uparrow E \times \Omega}$ and $$m^E[\{b\}]^{\uparrow E \times \Omega}$$

2. Then to combine these deconditionings by Dempster's rule, that is to say calculate $$m^\Omega[E1]^{\uparrow E \times \Omega} \oplus^D m^\Omega[E2]^{\uparrow E \times \Omega} \oplus^D m^E[\{a\}]^{\uparrow E \times \Omega} \oplus^D m^E[\{b\}]^{\uparrow E \times \Omega}$$

3. Then to marginalize on $\Omega$ the result of this combination, that is to say calculate $$(m^\Omega[E1]^{\uparrow E \times \Omega} \oplus^D m^\Omega[E2]^{\uparrow E \times \Omega} \oplus^D m^E[\{a\}]^{\uparrow E \times \Omega} \oplus^D m^E[\{b\}]^{\uparrow E \times \Omega})^{\downarrow \Omega}$$

By applying the deconditioning formula, we obtain:

$$m^E[\{a\}]^{\uparrow E \times \Omega}(\{a\} \times \{E1\}) \cup (\{b\} \times \{E\})) = 1,$$

$$m^E[\{b\}]^{\uparrow E \times \Omega}(\{b\} \times \{E2\}) \cup (\{a\} \times \{E\})) = 1,$$

$$m^\Omega[E1]^{\uparrow E \times \Omega}(\{a\} \times \{E1\}) \cup (\Omega \times \{E2\})) = m_{C1} \oplus^D m_{C2}(\{a\})$$

$$m^\Omega[E1]^{\uparrow E \times \Omega}(\Omega \times E) = m_{C1} \oplus^D m_{C2}(\{a,b\})$$

$$m^\Omega[E2]^{\uparrow E \times \Omega}(\{a\} \times \{E2\}) \cup (\Omega \times \{E1\})) = m_{C1} \oplus^P m_{C2}(\{a\})$$

$$m^\Omega[E2]^{\uparrow E \times \Omega}(\Omega \times E) = m_{C1} \oplus^P m_{C2}(\{a,b\})$$

By combining these deconditionings by Dempster's rule, we obtain a belief function, denoted $m_F^{E \times \Omega}$, on $E \times \Omega$ such that $$m_F^{E \times \Omega}(\{a\} \times \{E1\}) = m_{C1} \oplus^D m_{C2}(\{a\}) * m_{C1} \oplus^P m_{C2}(\{a\}) + m_{C1} \oplus^D m_{C2}(\{a,b\}) * m_{C1} \oplus^P m_{C2}(\{a\}) m_F^{E \times \Omega}((\{a\} \times \{E1\}) \cup (\{b\} \times \{E2\})) = m_{C1} \oplus^D m_{C2}(\{a\}) * m_{C1} \oplus^P m_{C2}(\{a,b\}) + m_{C1} \oplus^D m_{C2}(\{a,b\}) * m_{C1} \oplus^P m_{C2}(\{a,b\})$$

By marginalizing this belief function on $\Omega$, we obtain:

$$m_F(\{a\}) = m_{C1} \oplus^D m_{C2}(\{a\}) * m_{C1} \oplus^P m_{C2}(\{a\}) +$$
$$m_{C1} \oplus^D m_{C2}(\{a, b\}) * m_{C1} \oplus^P m_{C2}(\{a\})$$
$$= 0.84 * 0.8 + 0.16 * 0.8 = 0.8$$

$$m_F(\{a, b\}) = m_{C1} \oplus^D m_{C2}(\{a\}) * m_{C1} \oplus^P m_{C2}(\{a, b\}) +$$
$$m_{C1} \oplus^D m_{C2}(\{a, b\}) * m_{C1} \oplus^P m_{C2}(\{a, b\})$$
$$= 0.84 * 0.2 + 0.16 * 0.2$$
$$= 0.2$$

The result of the merge indicates that it is highly probable that the character observed is an $\{a\}$, although a slight degree of ignorance persists.

The invention can also be applied to other sectors, such as for example aerial target recognition. The sensors are then radars. The fusion system makes it possible to classify targets into predefined categories for example aircraft, helicopter and missile. The reasoning framework is then $\Omega=\{$aircraft, helicopter, missile$\}$.

The invention also relates to a device for fusion of information 200 originating from several sensors $C_1$, $C_2$ each producing a belief function $m_{C1}$, $m_{C2}$ and comprising several operating states E1, ..., EN. The device 200 comprises means 206 for the calculation of a merged belief function $m_F$ on the basis of the belief functions $m_{C1}$, $m_{C2}$ arising from the sensors $C_1$, $C_2$. The device comprises, furthermore, means for the calculation 203 of conditional belief functions, said means being linked to a predefined base of operators 105 comprising associations between states of sensors and merge operators, and in that the means for the calculation 206 of the merged belief function $m_F$ use the conditional belief functions calculated and knowledge regarding the operating state of the sensors originating from a knowledge base 104 regarding the operating state of the sensors.

According to a first variant embodiment of the device according to the invention, the knowledge base 104 regarding the operating state of the sensors comprises a belief function $m^E$ indicating the propensity of the sensors $C_1$, $C_2$ to be in a given operating state.

According to a second variant embodiment of the device according to the invention, the belief functions arising from the sensors being defined on a space of propositions $\Omega$, the knowledge base 104 regarding the operating state of the sensors comprises contextual information expressed in the following manner: if the object observed is of type A then the sensors have a propensity p to be in a set of states E', where A is a subset of the space of propositions $\Omega$ and E' is a subset of a set E of the various states E1, ..., EN of the sensors.

The invention also relates to a system for fusion of information comprising: at least two sensors $C_1$, $C_2$ each producing a belief function $m_{C1}$, $m_{C2}$ and means for fusion of the belief functions $m_{C1}$, $m_{C2}$ originating from the said sensors $C_1$, $C_2$. The fusion means are linked to the sensors. The means for fusion of information comprise the device for fusion of information 200 according to the invention.

The invention can also be applied for example within the framework of an aerial surveillance system charged with recognizing aircraft as a function of their model (airliners, fighter aircraft, helicopter) with the aid of a set of radars.

The invention claimed is:

1. A method for the fusion of information originating from two or more sensors ($C_1$, $C_2$) each producing respective belief functions ($m_{C1}$, $m_{C2}$) representing knowledge on a reasoning space ($\Omega$), and comprising several states (E1, ..., EN) each representing an operating state of the set of sensors, said method comprising:
    calculating a merged belief function ($m_F$); and
    calculating conditional belief functions on the basis of the belief functions ($m_{C1}$, $m_{C2}$) produced by the sensors ($C_1$, $C_2$) and of a predefined base of operators comprising associations between states of sensors and merge operators, wherein a conditional belief function represents knowledge of a sensor on the reasoning space ($\Omega$) when the set of sensors is in a given operating state (E1, ..., EN), and wherein a step of calculating the merged belief function ($m_F$) uses the conditional belief functions calculated and knowledge arising from a knowledge base regarding the operating state of the sensors, wherein the calculating the merged belief function ($m_F$) is carried out using contextual information indicating that, if an object observed by the sensors ($C_1$, $C_2$) is of type A, then the sensors have a propensity p to be in a set of states E', where A is a subset of the space of propositions ($\Omega$) and E' is a subset of a set E of the various states (E1, ..., EN) of the sensors and wherein the merged belief function ($m_F$) follows the following relation:

$$m_F = ((\oplus_{i=1,...,N}^D m^\Omega[Ei] \uparrow^{E \times \Omega}) \oplus^D (\oplus_{j=1,...,K}^D m^E[Aj] \uparrow^{E \times \Omega})) \downarrow^\Omega$$

where $\oplus^D$ is an operator called the unnormalized Dempster's rule, $m^\Omega[Ei]$, with i=1, ..., N, are conditional belief functions representing knowledge on the reasoning space ($\Omega$) when the sensors are in various states (E1, ..., EN), N being the number of operating states, and $m^E[Aj]$ is contextual knowledge regarding the propensity of the sensors to be in a given operating state when an object observed by the sensors is of type $A_j$, with j=1, ..., K, $A_j$ being a subset of $\Omega$ and such that $A_1, ..., A_K$ forms a partition of $\Omega$, $\uparrow$, $\downarrow$ and $\Uparrow$ being operations for manipulating belief functions being a vacuous extension, a marginalization and a deconditioning, respectively.

2. The method for fusion of information according to claim 1, wherein the knowledge regarding the operating state of the sensors is represented by the belief function ($m^E$) indicating the propensity of the sensors ($C_1$, $C_2$) to be in a given operating state.

3. A physical device for acquiring data originating from several sensors each producing a belief function representing knowledge on a reasoning space and comprising several operating states, the device being configured to:
    calculate a merged belief function;
    calculate conditional belief functions, the device being linked to the sensors and to a predefined base of operators comprising associations between states of sensors and merge operators, a conditional belief function representing knowledge of a sensor on the reasoning space when said sensor is in a given operating state, and wherein the merged belief function is calculated using the conditional belief functions calculated and knowledge regarding the operating state of the sensors originating from a knowledge base regarding the operating state of the sensors,
    the device being further configured to calculate the merged belief function ($m_F$) is calculated by using contextual information indicating that, if an object observed by the sensors ($C_1$, $C_2$) is of type A, then the sensors have a propensity p to be in a set of states E', where A is a subset of the space of propositions ($\Omega$) and E' is a subset of a set E of the various states (E1, ..., EN) of the sensors, and wherein the merged belief function ($m_F$) follows the following relation:

$$m_F = ((\oplus_{i=1,\ldots,N}{}^D m^\Omega[Ei] \uparrow^{E \times \Omega}) \oplus^D (\oplus_{j=1,\ldots,K}{}^D m^E[Aj] \uparrow^{E \times \Omega}))\downarrow\Omega$$

where $\oplus^D$ is an operator called the unnormalized Dempster's rule, $m^\Omega[Ei]$, with $i=1, \ldots, N$, are conditional belief functions representing knowledge on the reasoning space ($\Omega$) when the sensors are in various states (E1, ..., EN), N being the number of operating states, and $m^E[Aj]$ is contextual knowledge regarding the propensity of the sensors to be in a given operating state when an object observed by the sensors is of type $A_j$, with $j=1, \ldots, K$, $A_j$ being a subset of $\Omega$ and such that $A_1, \ldots, A_K$ forms a partition of $\Omega$, $\uparrow$, $\downarrow$ and $\Uparrow$ being operations for manipulating belief functions being a vacuous extension, a marginalization and a deconditioning, respectively.

4. The physical device for acquiring data according to claim 3, wherein the knowledge base regarding the operating state of the sensors comprises belief functions indicating the propensity of the sensors to be in a given operating state.

5. The physical device for acquiring data according to claim 3, wherein the knowledge base regarding the operating state of the sensors comprises contextual information indicating that, if an object observed by the sensors is of type A then the sensors have a propensity p to be in a set of states E', where A is a subset of the space of propositions and E' is a subset of a set E of the various states (E1, ..., EN) of the sensors.

6. A system for fusion of information comprising:
at least two sensors each producing a belief function; and
a physical device for acquiring data originating from the at least two sensors each producing a belief function representing knowledge on a reasoning space and comprising several operating states, the device being configured to:
calculate a merged belief function;
calculate conditional belief functions, the device being linked to the sensors and to a predefined base of operators comprising associations between states of sensors and merge operators, a conditional belief function representing knowledge of a sensor on the reasoning space when said sensor is in a given operating state, and wherein the merged belief function is calculated using the conditional belief functions calculated and knowledge regarding the operating state of the sensors originating from a knowledge base regarding the operating state of the sensors, the device being further configured to calculate the merged belief function ($m_F$) is calculated by using contextual information indicating that, if an object observed by the sensors ($C_1, C_2$) is of type A, then the sensors have a propensity p to be in a set of states E', where A is a subset of the space of propositions ($\Omega$) and E' is a subset of a set E of the various states (E1, ..., EN) of the sensors, and wherein the merged belief function ($m_F$) follows the following relation:

$$m_F = ((\oplus_{i=1,\ldots,N}{}^D m^\Omega[Ei] \uparrow^{E \times \Omega}) \oplus^D (\oplus_{j=1,\ldots,K}{}^D m^E[Aj] \uparrow^{E \times \Omega}))\downarrow\Omega$$

where $\oplus^D$ is an operator called the unnormalized Dempster's rule, $m^\Omega[Ei]$, with $i=1, \ldots, N$, are conditional belief functions representing knowledge on the reasoning space ($\Omega$) when the sensors are in various states (E1, ..., EN), N being the number of operating states, and $m^E[Aj]$ is contextual knowledge regarding the propensity of the sensors to be in a given operating state when an object observed by the sensors is of type $A_j$, with $j=1, \ldots, K$, $A_j$ being a subset of $\Omega$ and such that $A_1, \ldots, A_K$ forms a partition of $\Omega$, $\uparrow$, $\downarrow$ and $\Uparrow$ being operations for manipulating belief functions being a vacuous extension, a marginalization and a deconditioning, respectively.

7. The system for fusion of information according to claim 6, wherein the knowledge base regarding the operating state of the sensors comprises belief functions indicating the propensity of the sensors (C1, C2) to be in a given operating state.

8. The system for fusion of information according to claim 6, wherein the knowledge base regarding the operating state of the sensors comprises contextual information indicating that: if an object observed by the sensors is of type A then the sensors have a propensity p to be in a set of states E', where A is a subset of the space of propositions ($\Omega$) and E' is a subset of a set E of the various states (E1, ..., EN) of the sensors.

\* \* \* \* \*